Aug. 12, 1952     R. P. KOEHRING     2,606,831

METHOD OF IMPREGNATION

Filed April 18, 1950

INVENTOR
ROLAND P. KOEHRING
BY
HIS ATTORNEYS

Patented Aug. 12, 1952

2,606,831

UNITED STATES PATENT OFFICE 2,606,831

METHOD OF IMPREGNATION

Roland P. Koehring, Dayton, Ohio, assignor to General Motors Corporation, Detroit, Mich., a corporation of Delaware Application April 18, 1950, Serial No. 156,619

3 Claims. (Cl. 75—22)

This invention relates to the impregnation of porous ferrous metals and is particularly concerned with the impregnation of porous ferrous metals with cupreous metals.

It is therefore the basic object of the invention to provide a method for impregnating porous ferrous material with a cupreous metal wherein partial or complete impregnation is obtained without channeling or pitting of the ferrous part.

In carrying out the above object, it is a further object to carry out the impregnation of the porous ferrous part with a cupreous metal through a gate or other porous ferrous portion which is not a portion of the part to be impregnated, whereby pitting and channeling of the porous ferrous gate portion satisfies the dissolving action of the cupreous metal for iron whereby the part to be actually impregnated is free from pits or channels.

Further objects and advantages of the present invention will be apparent from the following description, reference being had to the accompanying drawing, wherein preferred embodiments of the present invention are clearly shown.

Figure 1:
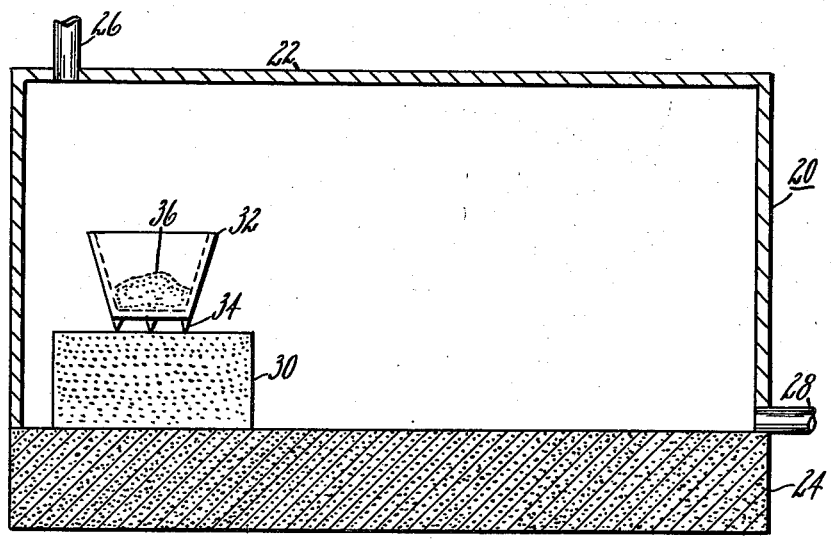
Fig. 1 is a diagrammatic view of one type of furnace which may be used for impregnating the ferrous parts wherein the cupreous metal is run through a crucible including at least a portion of the porous ferrous material, which crucible is placed in contact with the part to be impregnated.

In the impregnation of porous ferrous material, such as, porous iron, porous steel, or porous ferrous materials containing small quantities of the usual alloying ingredients, such as, carbon, manganese, silicon, vanadium, chromium, nickel or any other suitable alloying material, several means have been proposed for accomplishing the result desired. The simplest method for impregnating porous ferrous material is simply dipping the porous ferrous material into a molten cupreous material held at the desired temperature well below the melting point of the ferrous material. This method is rather crude and while it is satisfactory in some respects, it is difficult to control the amount of impregnation and it is also difficult to control the dissolving action of the molten cupreous material on the porous ferrous material.

In this connection, copper or copper bearing materials have a definite affinity for iron and while not generally alloyable with the iron in any appreciable amounts, these cupreous materials nevertheless have a dissolving action on iron to a degree at elevated temperatures, for example, above the melting point of copper. This dissolving action causes deleterious effects in the impregnation of ferrous material with copper or copper bearing materials due to the fact that dissolving action of the molten cupreous materials pits and channels the ferrous part at the point of entry thereof.

Various suggestions have been set forth for reducing and/or eliminating these deleterious effects, for example, in the Bourne Patent #2,401,221, additions of iron to the copper are suggested for satisfying the dissolving action of copper on iron prior to the time that the cupreous material enters the porous ferrous part. While this process operates extremely well in many cases, there are other instances where, when appreciable impregnations are being carried out, that pitting is still apparent due to the fact that so much cupreous material is being used that at the point of entry which is generally of relatively small area, it is almost impossible to properly satisfy the dissolving action thereof on iron by mere addition of alloyable powder to the cupreous material being used as an impregnant. This may further be explained by the fact that the dissolving action of copper on iron is not apparent at low temperatures since the two metals are substantially unalloyable but at temperatures, for example, 2000° F., there is a definite dissolving action wherein the copper will take up in the order of 5% of iron. This iron is substantially reprecipitated in the unalloyed condition after the temperature is reduced. Thus it is desirable in certain phases of porous ferrous metal impregnation with cupreous materials especially where the quantity of cupreous material is large due to the high porosity in the ferrous part to provide other means for satisfying this dissolving action. In Schwarzkopf Patent #2,422,439, additions of nickel and manganese to the copper are suggested for improving the condition and for acting as a de-oxidizer to improve impregnation. Various other means for accomplishing this end have also been suggested but in most cases the solution of the problem is either expensive or difficult to control, thereby making production costly.

I have discovered that a simple means for solving the problem which is easy to control in production and inexpensive to operate consists in providing a gate in the form of a crucible of the base metal through which the impregnant metal may be run into the main body of the part to be impregnated whereby the cupreous material at the temperature of impregnation first contacts the base metal of the ferrous crucible and dissolves at the proper temperature the necessary amount of the base metal prior to the entry of the impregnating material into the part to be impregnated. In this manner, the part to be impregnated is in no way deleteriously effected by the impregnant and the part through which the impregnant enters may be eliminated or reused if in the form of a crucible.

Referring specifically to the drawing, Fig. 1 shows a diagrammatic view of a furnace 20 which includes a cover 22 and a base 24. The base, in this connection, is a graphite plate or it may be an oxidized chromium steel plate or any other suitable material. The furnace 20 is heated electrically and is provided with a satisfactory non-oxidizing atmosphere through an inlet pipe 26. Gases are exhausted from the furnace through an outlet pipe 28 whereby the furnace atmosphere is maintained at substantially atmospheric pressure. The porous ferrous part is shown at 30 and is diagrammatically depicted as a block of porous ferrous material. A porous ferrous crucible 32 having a plurality of legs 34 is set upon the ferrous part 30 and the cupreous impregnant 36 is placed therein in a desired quantity. The furnace with the crucible and part 30 to be impregnated is then heated to a temperature above the melting point of the cupreous material, for example, about 2000° F., whereupon the cupreous metal melts within the crucible 32 and is drawn by capillarity through the legs 34 into the porous ferrous part 30 to impregnate the same. After cooling the impregnated part, the crucible may be easily removed therefrom due to the small area contact between the legs and the part to be impregnated and may be reused any number of times so long as the ferrous material of the crucible remains. In this connection, the crucible 32 may be formed in any desired manner, for example, the side walls thereof may be oxidized chromium steel or the like and merely the bottom portion and legs may be formed from porous sintered ferrous material. In this manner as a dissolving action of the cupreous impregnant dissolves away the porous ferrous portion of the crucible. This portion may be replaced by a new bottom and the remaining parts of the crucible may be reused any number of times.

Figure 2:
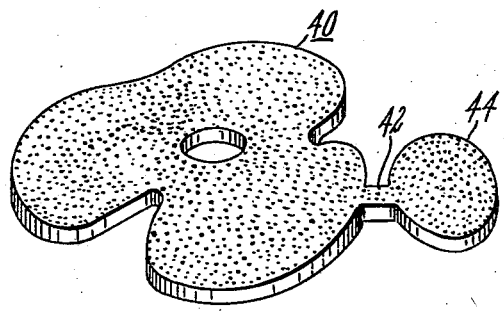
Fig. 2 is a view in perspective of a cam utilizing a gate for impregnation process.

Another embodiment of the present invention comprehends the formation of a gate on the ferrous part to be impregnated. This is depicted in Fig. 2 wherein a cam 40 is shown having a gate 42 connected to a plateau portion 44. The cam is formed from briquetted ferrous material as is the gate. In practice, the cam is placed in a furnace and the desired weight of cupreous material to be used as the impregnant is placed on the plateau 44. The part is then heated and when the melting point of the cupreous material is exceeded, said material melts and is drawn by capillarity into the plateau portion 44 through the gate 42 and into the article 40. Uniform impregnation is obtained in this manner and after cooling, the plateau portion 44 may be broken off at the gate 42 and discarded.

It is apparent in this embodiment that the dissolving action of the cupreous material occurs in the plateau portion 44 whereby the molten impregnant passing through the gate 42 has been satisfied with respect to ferrous material at the temperature of impregnation. This is very important since, as previously shown, the dissolving action of cupreous materials on ferrous materials varies as the temperature varies and only under the conditions set forth in this disclosure is full satisfaction obtained since the dissolving action of the cupreous material on the ferrous material occurs at the temperature of impregnation. It is understood that any of the well known cupreous materials may be used as impregnant such as copper, copper alloys with small quantities of iron, zinc, nickel, maganese, aluminum, phosphorous, silicon or bronzes including prosphorous, silicon, or berylium, etc. In fact, any cupreous material wherein copper is at least 50% of the alloy or mixture of metals and wherein the melting point of the cupreous material is less than the melting point of the ferrous part to be impregnated.

In all cases the crux of the method is to utilize an expendable and/or removable portion connecting directly to the part to be impregnated through which the impregnant may be flowed at the impregnating temperature, whereby full dissolution satisfaction is obtained prior to entry of the impregnant into the part being impregnated.

While the embodiments of the present invention as herein disclosed, constitute preferred forms, it is to be understood that other forms might be adopted.

What is claimed is as follows:

1. In a method of impregnating a porous ferrous part with a cupreous metal wherein pitting and channelling of the ferrous part is completely eliminated, the steps comprising; briquetting a porous ferrous part from ferrous metal powder and simultaneously forming an integral extension thereon connected to the remainder of the part by a narrowed neck portion, sintering said part and connected extension for forming a porous metal article, placing cupreous metal in predetermined quantities and of the desired constituency upon said extension only, heating the assembly under non-oxidizing conditions at a temperature above the melting point of the cupreous metal and below the melting point of the ferrous metal under suitable conditions of time, temperature and atmosphere to cause the cupreous metal to melt and flow by capillarity through said extension and neck and into the ferrous metal for impregnating the part, cooling the impregnated part and its integral extension under suitable conditions and finally removing the extension from the ferrous part at the neck portion thereof.

2. In a method of impregnating a porous ferrous part with an impregnant metal of lower melting point and containing at least 50% copper therein wherein pitting and channelling of the ferrous part is completely eliminated, the steps comprising; compressing ferrous metal powder into a self-sustaining article of the desired shape which includes an additional gate portion integrally connected thereto through a reduced cross section neck, sintering said part and connected gate under suitable conditions of time, temperature and atmosphere for forming a porous metal article including a gate, positioning a predetermined quantity of the impregnant metal on said gate portion only, heating the article, gate and impregnant metal under suitable conditions at a temperature intermediate the melting points of the impregnant metal and the ferrous metal of the part, for a time sufficient to melt the impregnant metal and cause the same to flow by capillarity through said gate and neck and into the porous ferrous part for impregnating the part and the gate, cooling the impregnated part and gate under suitable conditions and finally removing the gate from the ferrous metal part at the neck thereof.

3. In a method for impregnating a porous ferrous part with a lower melting impregnant metal comprising at least 50% copper wherein pitting and channelling of the ferrous part is completely eliminated, the steps comprising; forming a porous ferrous metal part from ferrous metal powder wherein the part includes an integral necked extension thereon which is expandable and comprises an addition to the ferrous metal part ultimately desired, placing a desired quantity of impregnant metal on said extension only, heating the part and the impregnant metal at a temperature above the melting point of the impregnant metal and below the melting point of the ferrous metal part under suitable conditions of time and atmosphere to melt the impregnant metal and to cause it to flow by capillarity through said extension and into said part, simultaneously dissolving sufficient ferrous metal in said extension only and at the impregnating temperature, to satisfy the dissolving action of the impregnant metal for the ferrous metal, cooling the impregnated part, and finally removing the necked extension therefrom.

ROLAND P. KOEHRING.

REFERENCES CITED

The following references are of record in the file of this patent:

UNITED STATES PATENTS

| Number | Name | Date |
|---|---|---|
| 1,853,385 | Spade et al. | Apr. 12, 1932 |
| 2,401,221 | Bourne | May 28, 1946 |

OTHER REFERENCES

Peters: Cemented Steels, published in Materials & Methods, April 1946, page 987.